United States Patent
Craggs et al.

(10) Patent No.: US 11,652,652 B2
(45) Date of Patent: May 16, 2023

(54) FUNCTION AS A SERVICE CONSOLE FOR AN ONLINE APPLICATION EXCHANGE PLATFORM

(71) Applicant: AppDirect, Inc., San Francisco, CA (US)

(72) Inventors: Daniel Craggs, Montreal (CA); Mathew Spolin, San Francisco, CA (US); Fivos Constantinou, San Francisco, CA (US); Jean-Philippe Boudreault, Montreal (CA); Raheem Syed, San Francisco, CA (US)

(73) Assignee: AppDirect, Inc., San Francisco, CA (US)

( * ) Notice: Subject to any disclaimer, the term of this patent is extended or adjusted under 35 U.S.C. 154(b) by 1 day.

(21) Appl. No.: 17/357,307

(22) Filed: Jun. 24, 2021

(65) Prior Publication Data
US 2022/0417046 A1    Dec. 29, 2022

(51) Int. Cl.
*H04L 41/5054* (2022.01)
*H04L 12/14* (2006.01)

(52) U.S. Cl.
CPC ................. *H04L 12/1432* (2013.01)

(58) Field of Classification Search
CPC .... H04L 12/1432; H04L 9/50; H04L 2209/56
See application file for complete search history.

(56) References Cited

U.S. PATENT DOCUMENTS

2011/0035287 A1\* 2/2011 Fox .................. G06Q 30/02 705/26.1
2013/0346569 A1\* 12/2013 Smith ................. H04L 41/0803 709/220

(Continued)

FOREIGN PATENT DOCUMENTS

WO    2020-096639 A1    5/2020
WO    2021-067510 A1    4/2021

OTHER PUBLICATIONS

Wikipedia, "Function as a service." last edited on Apr. 5, 2021, downloaded from <https://en.wikipedia.org/wiki/Function_as_a_service> on Apr. 26, 2021, 2 pages.

(Continued)

*Primary Examiner* — Abdelnabi O Musa
(74) *Attorney, Agent, or Firm* — McDermott Will & Emery LLP

(57) ABSTRACT

A method for managing an application exchange platform includes receiving, from a developer, a service function, wherein the service function includes configuration details for an application available through an online application exchange. The method includes deploying the service function in the application exchange, identifying a first domain event requesting access to the service function from a user, and calling the service function in the online application exchange, in response to the first domain event. The method also includes recording a metric associate with the service function and a return parameter, emitting a second domain event indicative of a completion of the service function, and charging, with a billing tool, an appropriate party based on a usage metadata for the service function. A system and a non-transitory, computer-readable memory storing instructions to cause the system to perform the above method are also provided.

20 Claims, 7 Drawing Sheets

(56) References Cited

U.S. PATENT DOCUMENTS

| | | | | |
|---|---|---|---|---|
| 2016/0253650 A1* | 9/2016 | Cohen | .................. | G06Q 20/407 |
| | | | | 705/44 |
| 2017/0126903 A1* | 5/2017 | Cohen | ..................... | H04L 67/02 |
| 2019/0028368 A1* | 1/2019 | Modi | .................. | H04L 41/0816 |
| 2019/0097909 A1* | 3/2019 | Puri | ........................ | H04L 43/08 |
| 2021/0125128 A1* | 4/2021 | Martin | .............. | G06Q 30/0283 |

OTHER PUBLICATIONS

USPTO—International Search Report and Written Opinion dated Oct. 12, 2022 for related International Application No. PCT/US2022/034598, 12 pgs.

* cited by examiner

FIG. 3

FUNCTION AS A SERVICE CONSOLE FOR AN ONLINE APPLICATION EXCHANGE PLATFORM

BACKGROUND

Field

The present disclosure relates to online platforms for developers to offer applications for the public and keep track of domain events associated with one or more applications in a flexible manner. More specifically, the present disclosure provides function as a service (FaaS) handles in an online application exchange platform to allow developers to deploy code for added value to an application when triggered by a domain event, and keep track of the service costs.

Related Art

Current application exchange platforms have rigid architectures that preclude the tracking of added features to one or more applications, especially in terms of service costs. Typically, the usage of computational resources and access to authorized parties creates a complex track that results in revision overtime and ultimately loss revenue. When a user wants to expand access to an application service or perform outgoing calls to a third party, there is no simple way to handle subscriptions and credentials, keep track of billing items, and assess what party is responsible for what piece of the incurred cost. What is needed is a flexible way to manage an application exchange platform that provides developers, platform owners, and application end users direct access to added features, new applications, new services, and a transparent cost distribution.

BRIEF DESCRIPTION OF THE FIGURES

The accompanying drawings, which are included to provide further understanding and are incorporated in and constitute a part of this specification, illustrate disclosed embodiments and, together with the description, serve to explain the principles of the disclosed embodiments. In the drawings:

FIG. 3 illustrates a group of online applications offered in an online application exchange platform, according to some embodiments.

In the figures, elements and steps denoted by the same or similar reference numerals are associated with the same or similar elements and steps, unless indicated otherwise.

SUMMARY

Figure 1:
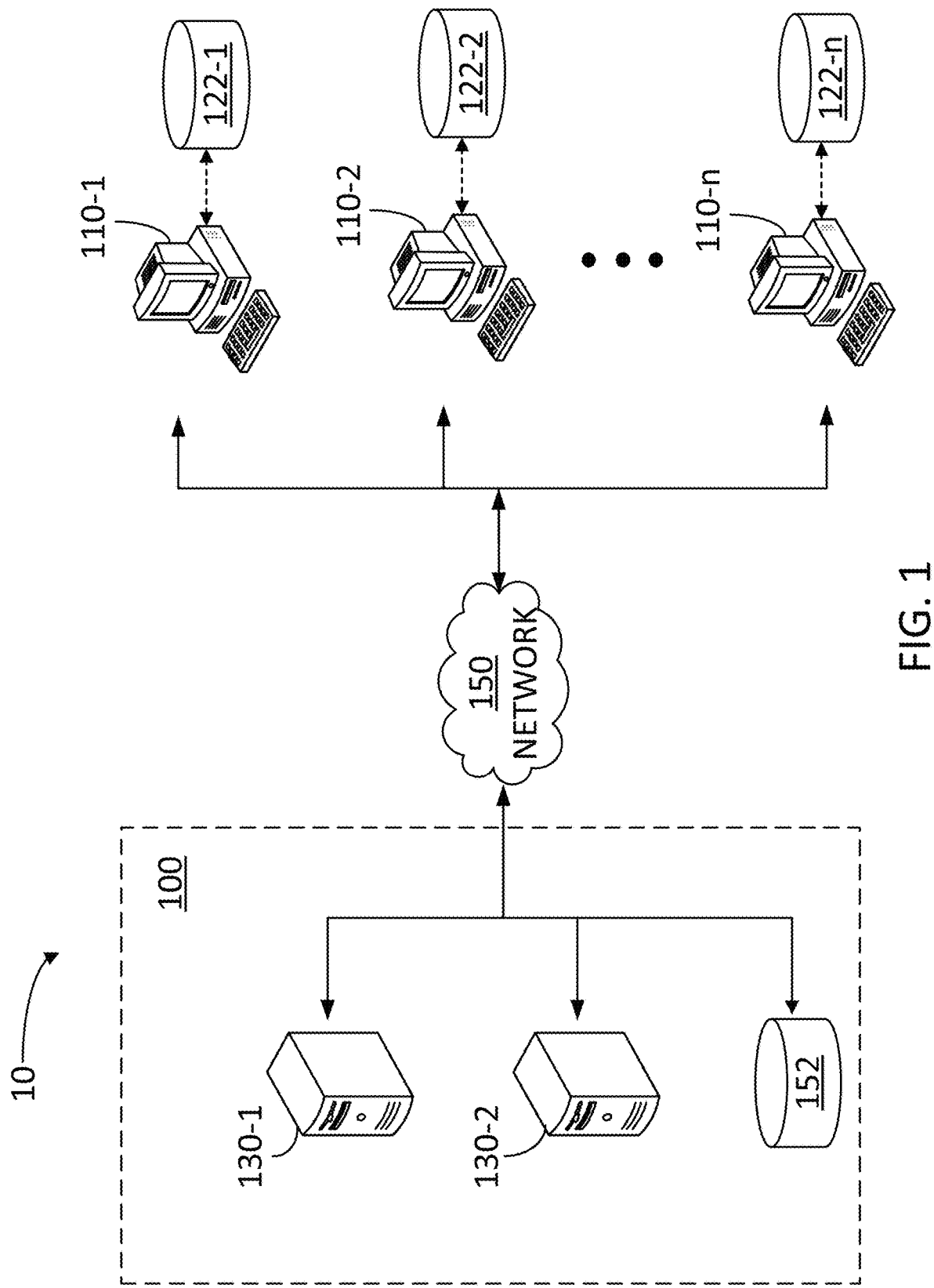
FIG. 1 illustrates an example architecture suitable to provide an online application exchange platform, according to some embodiments.

In a first embodiment, a computer-implemented method includes receiving, from a developer, a service function, wherein the service function includes configuration details for an application available through an online application exchange. The computer-implemented method also includes deploying the service function in the online application exchange, identifying a first domain event requesting access to the service function from a user, and calling, with a wrapper function, the service function in the online application exchange, in response to the first domain event. The computer-implemented method also includes recording, with a wrapper function executed on top of the service function, a metric associated with the service function and a return parameter, emitting a second domain event indicative of a completion of the service function, and charging, with a billing tool, an appropriate party based on a usage metadata for the service function.

In a second embodiment, a system includes a memory, storing instructions and one or more processors. The one or more processors are configured to execute the instructions to cause the system to receive, from a developer, a service function, wherein the service function includes configuration details for an application available through an online application exchange. The one or more processors also execute instructions to cause the system to deploy the service function in the online application exchange, to identify a first domain event requesting access to the service function from a user, to call, with a wrapper function, the service function in the online application exchange, in response to the first domain event, and to record, with a wrapper function executed on top of the service function, a metric associated with the service function and a return parameter. The one or more processors also execute instructions to cause the system to emit a second domain event indicative of a completion of the service function, to charge, with a billing tool, an appropriate party based on a usage metadata for the service function, and to grant fine grained permissions to an end user based on the configuration details.

In a third embodiment, a non-transitory, computer-readable medium stores instructions which, when executed by a processor, cause a computer to perform a method, the method includes receiving, from a developer, a service function, wherein the service function includes configuration details for an application available through an online application exchange, deploying the service function in the online application exchange, and identifying a first domain event requesting access to the service function from a user. The method also includes calling, with a wrapper function, the service function in the online application exchange, in response to the first domain event, recording, with a wrapper function executed on top of the service function, a metric associated with the service function and a return parameter, and emitting a second domain event indicative of a completion of the service function. The method also includes charging, with a billing tool, an appropriate party based on a usage metadata for the service function, granting fine grained permissions to an end user based on the configuration details, and decrypting a secret key in the configuration details upon receipt of the first domain event.

In yet another embodiment, a system includes a means for storing instructions and a means for executing the instructions. The means for executing instructions are configured to cause the system to receive, from a developer, a service function, wherein the service function includes configuration details for an application available through an online application exchange. The means for executing instructions also causes the system to deploy the service function in the online application exchange, to identify a first domain event requesting access to the service function from a user, to call, with a wrapper function, the service function in the online application exchange, in response to the first domain event, and to record, with a wrapper function executed on top of the service function, a metric associated with the service function and a return parameter. The means for executing instructions also causes the system to emit a second domain event indicative of a completion of the service function, to charge, with a billing tool, an appropriate party based on a usage metadata for the service function, and to grant fine grained permissions to an end user based on the configuration details.

DETAILED DESCRIPTION OF THE FIGURES

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Current application exchange platforms have rigid architectures that preclude the tracking of added features to one or more applications, especially in terms of service costs. Typically, the usage of computational resources and access to authorized parties creates a complex track that results in revision overtime and ultimately loss revenue for developers and platform owners. Ultimately, these deficiencies are passed down to the end users (e.g., application subscribers) in the form of cumbersome interactions and unsatisfactory performance.

To resolve the above technical problems arising in the field of computer networking, an application exchange platform as disclosed herein offers a user interface (UI) where a developer can select which domain event they wish to subscribe to. In some embodiments, a developer may also specify configurations such as whitelisted universal resource locations (URLs) that a function in an application may call out to. The developer may also establish fine grained permissions or roles to grant a function in the application, as well as an authorization context such as secrets, and external authorization server URLs.

In addition, some embodiments include an authorization server to offer a developer the ability to implement authentication of external resources to make external calls to whitelisted URLs. In another embodiment, the platform includes an interceptor to inject authorization credentials to whitelisted URLs into function calls configured by the developer.

To facilitate the handling of service functions in an application, an application exchange platform as disclosed herein may provide a lightweight, wrapper function. The wrapper function measures the metrics of tool usage while the application is run by an end user. Based on this metric data, once the service function completes execution, the metrics can be forwarded to a usage/billing service and charged to the appropriate party. In some embodiments, a developer may wish to absorb the cost themselves, and in some embodiments, the developer may want to transfer the fees onto the end user. The fees generated can be determined by the exchange platform, and the extra revenue could be split between the developer, the exchange platform, and the marketplace owner. This could be decided by the developer in one embodiment, in another it might be decided by the exchange platform. The detailed cost information can be propagated by the Wrapper Function when it reports the function result/usage. The Wrapper Function can also report unhandled exceptions to the dashboard for the developer.

System Overview

FIG. 1 illustrates an example architecture 10 suitable to provide an online application exchange platform 100, according to some embodiments. Online application exchange platform 100 may include one or more servers 130-1 and 130-2 (hereinafter, collectively referred to as "servers 130") coupled to a database 152. Online application exchange platform 100 may be accessed by one or more developers using client devices 110-1, 110-2, through 110-n (hereinafter, collectively referred to as "client devices 110"). The developers may create and upload applications 122-1, 122-2, through 122-n (hereinafter, collectively referred to as "applications 122") onto online application exchange platform 100 via a network 150.

Servers 130 may include any device having an appropriate processor, memory, and communications capability for hosting the documents and applications associated with the device provisioning engine. The device provisioning engine may be accessible by multiple participants through various client devices 110 over the network 150. Client devices 110 can be, for example, handsets, desktop computers (coupled with handsets, or standalone), mobile computers, tablet computers (e.g., including e-book readers), mobile devices (e.g., a smartphone or PDA), or any other devices having appropriate processor, memory, and communications capabilities for accessing the device provisioning engine on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
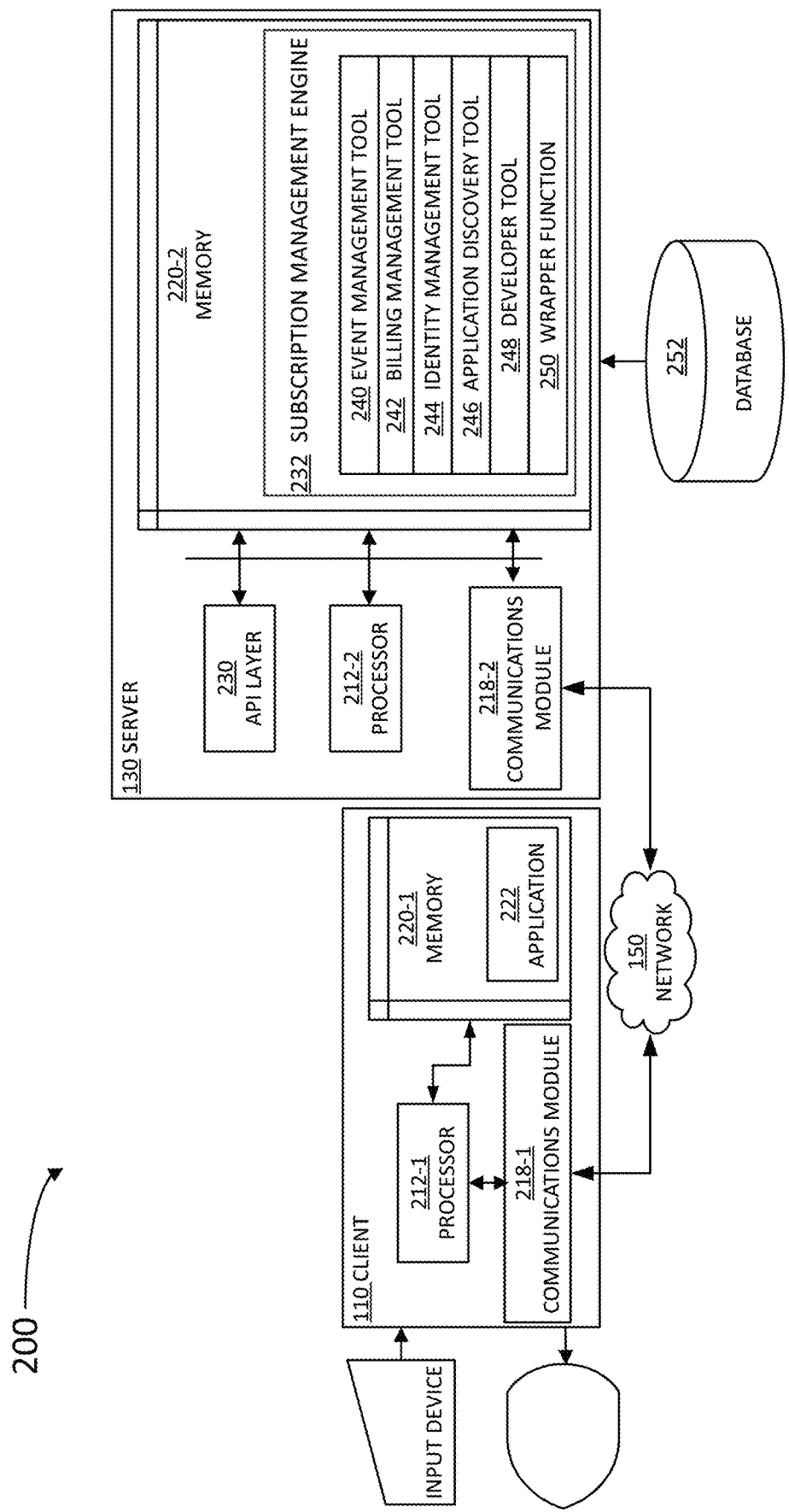
FIG. 2 is a block diagram illustrating an example server and client from the architecture of FIG. 1, according to certain aspects of the disclosure.

FIG. 2 is a block diagram 200 illustrating an example server 130 and client device 110 in the architecture 10, according to certain aspects of the disclosure. Client device 110 and server 130 are communicatively coupled over network 150 via respective communications modules 218-1 and 218-2 (hereinafter, collectively referred to as "communications modules 218"). Communications modules 218 are configured to interface with network 150 to send and receive information, such as data, requests, responses, and commands to other devices on the network. Communications modules 218 can be, for example, modems or Ethernet cards.

Client device 110 may be any one of a desktop computer, a laptop, or a mobile computing device. Client device 110 may include a processor 212-1 and a memory 220-1. Processor 212-1 is configured to execute instructions, such as instructions physically coded into processor 212-1, instructions received from software in memory 220-1, or a combination of both. An input device 214 and an output device 216 enable the user to interact with client device 110. Examples of input device 214 and output device 216 may include a mouse, a keyboard, a display, a touch-interactive display, and the like. A user of client device 110 may use input device 214 to submit a document or a media file to application programming interface (API) layer 230 via a user interface of application 222. Application 222 may enable the user of client device 110 to edit a document (text editor), to create presentation slides, or a chart including data, or perform any other computational task hosted by server 130.

Server 130 includes a memory 220-2, a processor 212-2, and communications module 218-2. Memory 220-2 includes a subscription management engine 232. Subscription management engine 232 includes instructions which, when executed by processor 212-2, cause server 130 to perform at least partially steps as disclosed herein. In some embodiments, subscription management engine 232 includes instructions to communicate with application 222 to add a user or a group of users, or to add a resource address that the users of application 222 may call, while running. An API layer 230 handles the communications between server 130 and application 222 in client device 110. Subscription management engine 232 may include an event management tool 240, billing management tool 242, an identity management tool 244, an application discovery tool 246, a developer tool 248, and a wrapper function tool 250.

Wrapper function 250 is configured to measure the metrics of tool usage while application 222 is running. Based on this metric data, subscription management engine 232 generates a usage/billing service. The detailed cost information can be propagated by wrapper function 250 when it reports the function result/usage. Wrapper function 250 can also report unhandled exceptions to the dashboard for the developer.

Furthermore, in some embodiments, subscription management engine 232 may include instructions to retrieve and provide to one or more users at least some of the data in a database 252 associated with a given application 222. Hereinafter, processors 212-1 and 212-2 will be collectively referred to as "processors 212," and memories 220-1 and 220-2 will be collectively referred to as "memories 220."

The user may access application 222 installed in memory 220-1 of client device 110. The user may access application 222 via a web browser installed in client device 110. Execution of application 222 may be controlled by processor 212-1 in client device 110. In some embodiments, application 222 is downloaded and installed by the user into client device 110, from server 130.

Figure 3:
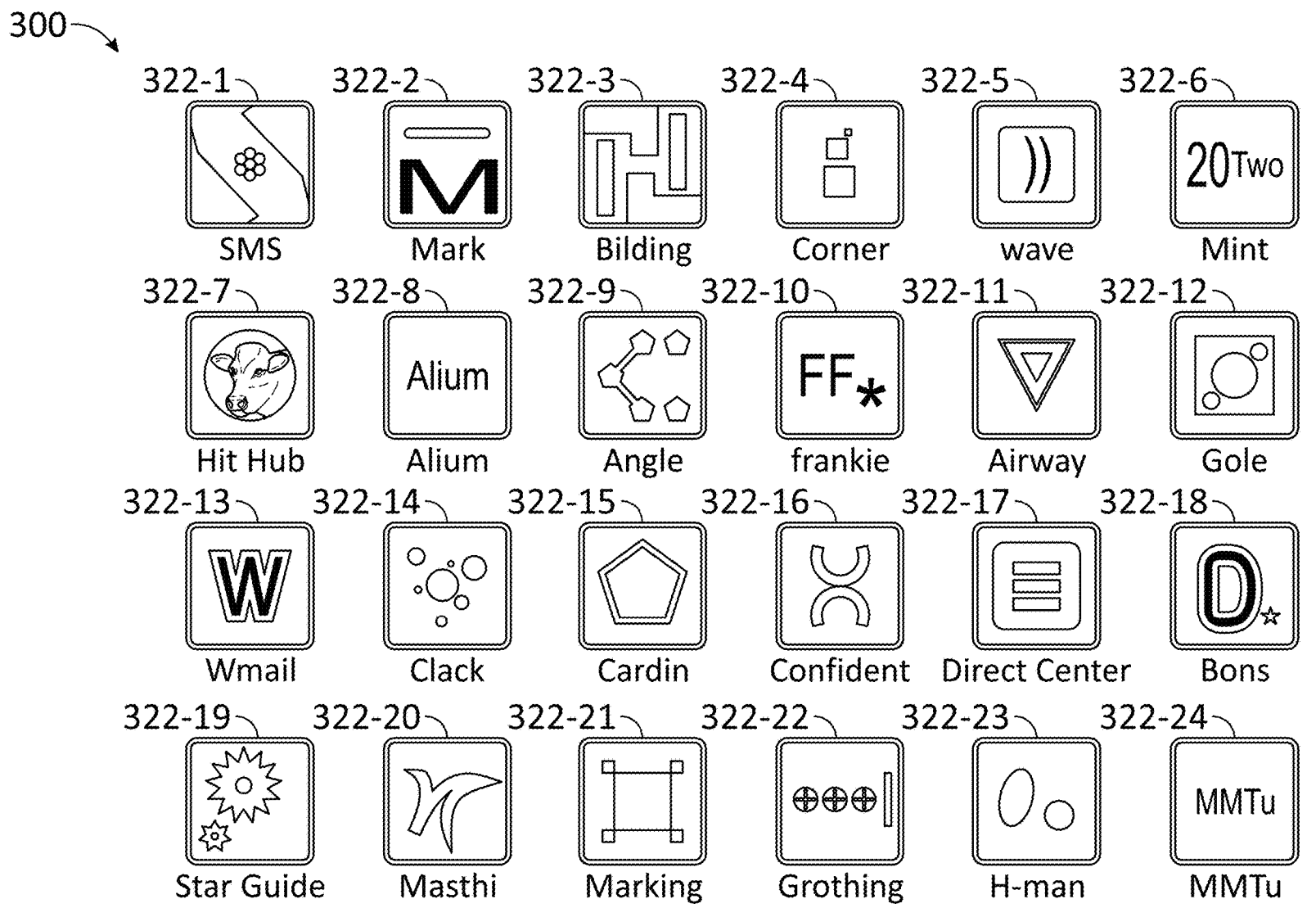

FIG. 3 illustrates a group of online applications 322-1 through 322-24 (hereinafter, collectively referred to as "applications 322") offered in an online application exchange platform 300, according to some embodiments. Applications 322 may include desktop-based applications such as text editors, comma delimited documents, table management applications, presentation creating applications, document editors, design applications, and the like. In some embodiments, an end user may access and run applications 322 via a web browser. In some embodiments, an end user may have a plug in for applications 322 installed in a client device, and run the application directly from the plug in.

Figure 4:
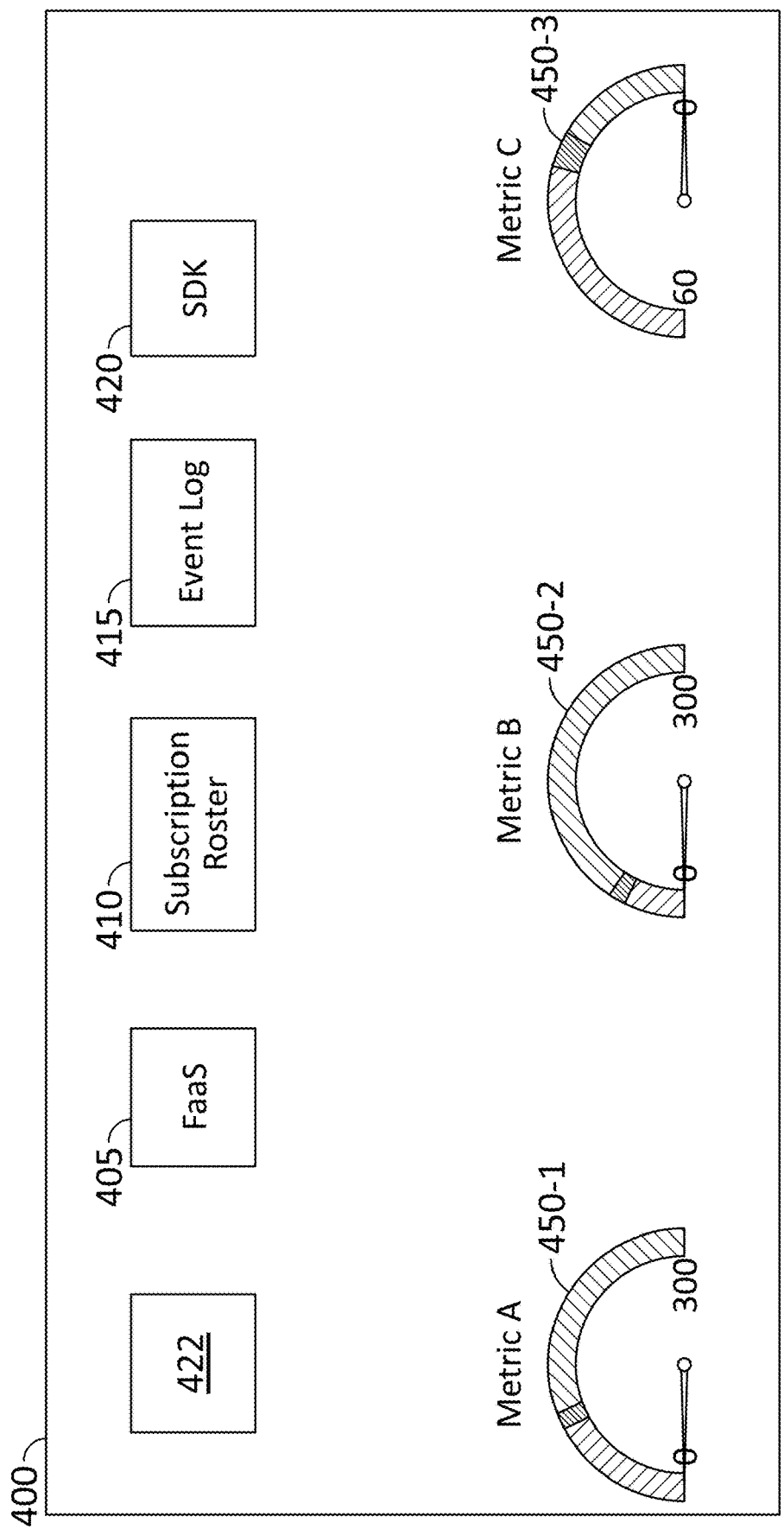
FIG. 4 illustrates a dashboard for an application in an application exchange platform, according to some embodiments.

FIG. 4 illustrates a dashboard 400 for an application 422 in an application exchange platform, according to some embodiments. Dashboard 400 enables developers to view functions usages and their outcome. In dashboard 400, an application 422 is selected by a developer of the application exchange platform. Dashboard 400 illustrates graphically, to the developer, different aspects of application performance associated with a service function, FaaS 405, such as a subscription roster 410 and an event log 415. Subscription roster 410 may include names, addresses, and contact information for the users that have access to application 422 and the resources it uses and provides (CPU, GPU, memory allocation, and the like). Subscription roster 410 may also include authorization credentials for the users, passwords and access codes, encrypted keys, and associated scripts that users may access or activate while logging into application 422. Event log 415 may include a list of events and times of occurrence for application 422. In some embodiments, event log 415 may include details as to the time a user has been logged into application 422, and any external call for resources and other services. Accordingly, the developer may have a clear indication of the costs incurred by different users while logged into application 422. In one embodiment it is possible for a function to be triggered by one or many events. The function can be written in a way that an abstract function can handle multiple types of events.

Dashboard 400 may also include graphical displays such as dials 450-1, 450-2, and 450-3 (hereinafter, collectively referred to as "dials 450"), or other graphical indicators for different metrics (e.g., metric A, metric B, metric C, and the like), wherein the metrics may be indicative of CPU usage, GPU usage, or memory usage of a given user, while logging into application 422.

Through event log 415, the developer may select an event, and be directed to an in browser integrated development environment (IDE), or alternatively a repository they can push to (e.g., a Git. repository) that has an auto generated method entry point to provide an event object. The developer can call internal GraphQL or REST application programming interfaces, emit their own events, or run any code they wish. In some embodiments, dashboard 400 may provide a software development kit (SDK) 420 for easier integration of FaaS 405 into application 422. Dashboard 400 may enable a developer to retry failed events, or cancel long running events that they would like to terminate.

In some embodiments, FaaS 405 may be configured to return parameters or an object with fields (e.g., dials 450 for metrics A, B, or C), as a result of an event or action. The values in dials 450 can represent the resulting status of the function, for example, an HTTP return code or pre-defined states of the function, such as SUCCEEDED, FAILED, and PENDING.

Figure 5:
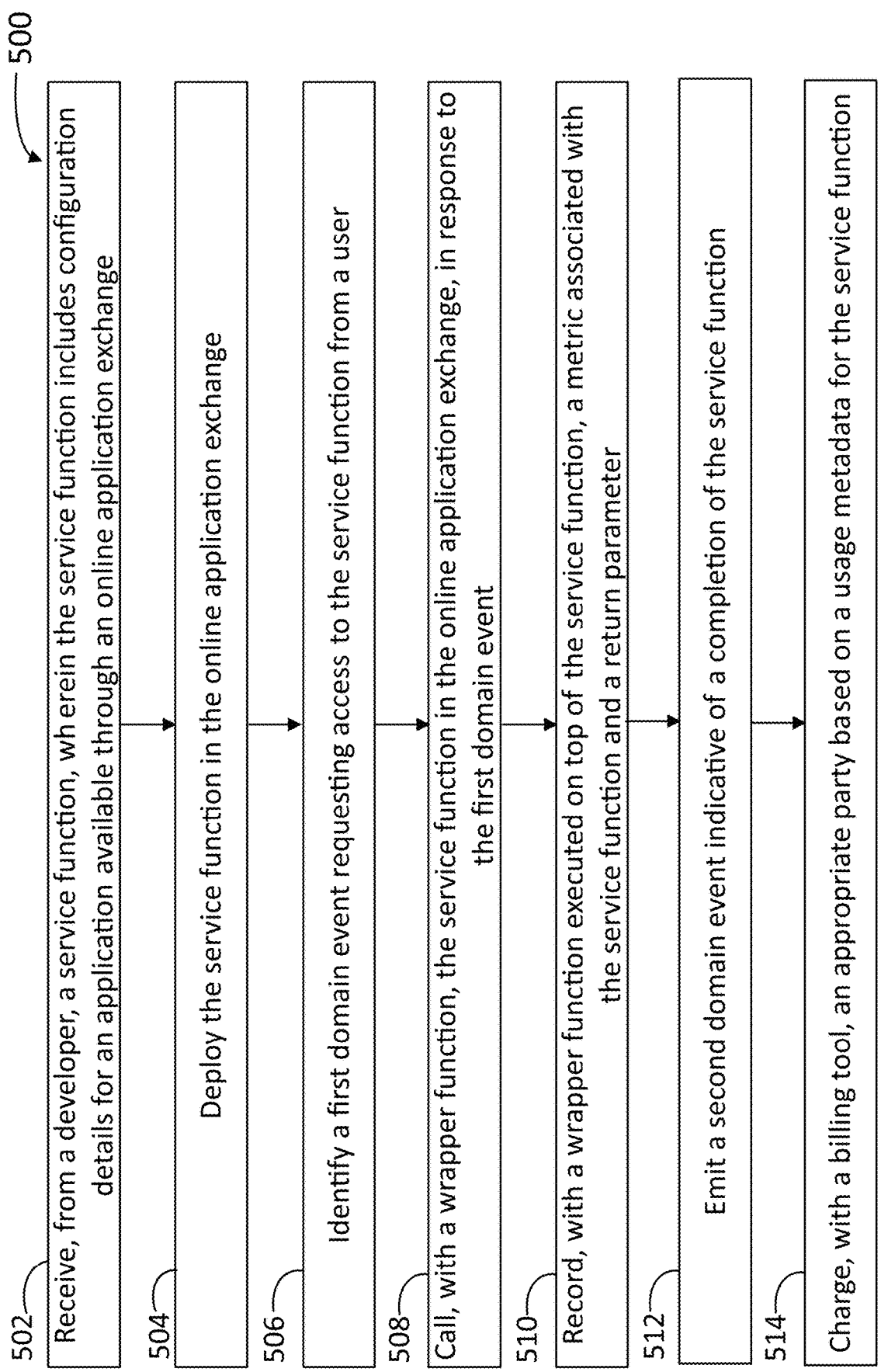
FIG. 5 is a flowchart illustrating steps in a method for managing a service function in an application exchange platform, according to some embodiments.

FIG. 5 is a flowchart illustrating steps in a method 500 for managing a service function in an application exchange platform, according to some embodiments. Method 500 may be performed at least partially by any one of the network servers hosting a subscription management engine (e.g., subscription management engine 232), while communicating with any one of a plurality of client devices (e.g., servers 130 and clients 110). To perform at least some of the steps in method 500, the subscription management engine may access an event management tool, a billing management tool, an identity management tool, an application discovery tool, a developer tool, and a wrapper function as disclosed herein (e.g., event management tool 240, billing management tool 242, identity management tool 244, application discovery tool 246, developer tool 248, and wrapper function 250). At least some of the steps in method 500 may be performed by a computer having a processor executing commands stored in a memory of the computer (e.g., processors 212 and memories 220). For example, at least some of the commands may be included in an application installed in a client device accessible by a user, and hosted via an API layer in the network server (e.g., application 222, API layer 230). Further, steps as disclosed in method 500 may include retrieving, editing, and/or storing files in a database that is part of, or is communicably coupled to, the computer (e.g., database 252). Methods consistent with the present disclosure may include at least some, but not all, of the steps illustrated in method 500, performed in a different sequence. Furthermore, methods consistent with the present disclosure may include at least two or more steps as in method 500 performed overlapping in time, or almost simultaneously.

Step 502 includes receiving, from a developer, a service function, wherein the service function includes configuration details for an application available through an online application exchange. In some embodiments, the configuration details include a whitelist and an external authentication network address, and step 502 includes granting fine grained permissions to end users based on the configuration details. In some embodiments, the configuration details include a secret key, and step 502 includes decrypting the secret key upon receipt of the first domain event.

Step 504 includes deploying the service function in the online application exchange. In some embodiments, the first domain event is a subscription request to an application from a user, and step 504 includes requesting user credentials to validate a user account for the application.

Step 506 includes identifying a first domain event requesting access to the service function from a user.

Step 508 includes calling, with a wrapper function, the service function in the online application exchange, in response to the first domain event.

Step 510 includes recording, with a wrapper function executed on top of the service function, a metric associated with the service function and a return parameter. In some embodiments, step 510 includes reporting, to the developer, the metric associated with the service function. In some embodiments, step 510 includes recording a return parameter provided by the service function. In some embodiments, step 510 includes generating a value for the metric as a nonlinear combination of a CPU usage, a number of threads used by the service function, and a memory usage. In some embodiments, the return parameter includes one of a "success," "fail," or "pending" event, and step 510 includes resubmitting a request for the service function when the return parameter is failed.

Step 512 includes emitting a second domain event indicative of a completion of the service function.

Step 514 includes charging, with a billing tool, an appropriate party based on a usage metadata for the service function. In some embodiments, step 514 includes determining a cost that has a non-linear dependence with a computational time usage to execute the service function. In some embodiments, step 514 includes updating a function dashboard in a developer console when the second domain event is emitted. In some embodiments, step 514 includes recording the domain event indicative of a completion of the service function in a database. In some embodiments, step 514 includes charging either of an end user of the application or a platform owner, based on a selection by the developer.

Figure 6:
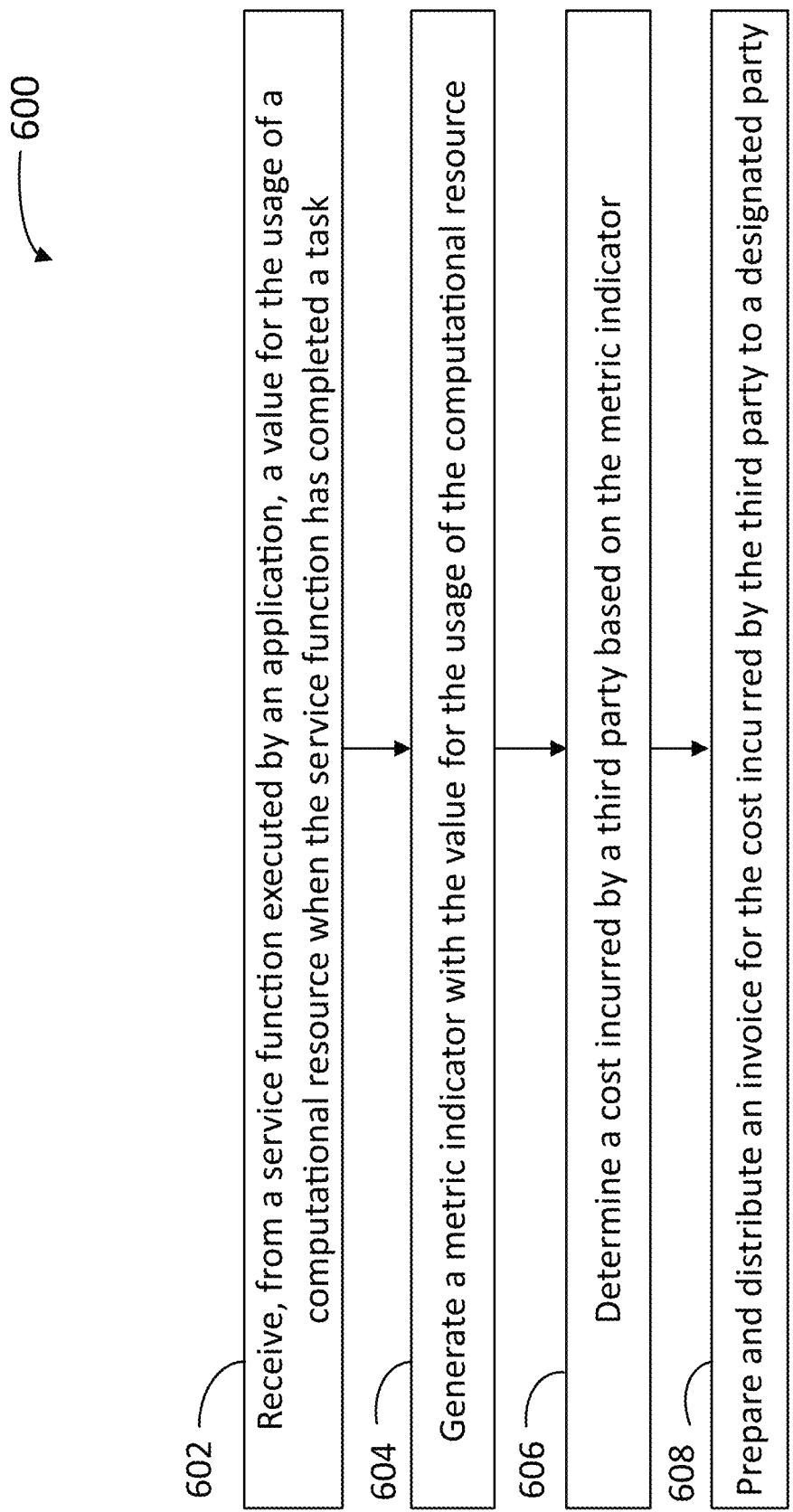
FIG. 6 is a flowchart illustrating steps in a method for configuring a wrapper function in a console for an online application exchange platform, according to some embodiments.

FIG. 6 is a flowchart illustrating steps in a method 600 for configuring a wrapper function, according to some embodiments. Method 600 may be performed at least partially by any one of the network servers hosting a subscription management engine (e.g., subscription management engine 232), while communicating with any one of a plurality of client devices (e.g., servers 130 and clients 110). To perform at least some of the steps in method 600, the subscription management engine may access an event management tool, a billing management tool, an identity management tool, an application discovery tool, a developer tool, and a wrapper function as disclosed herein (e.g., event management tool 240, billing management tool 242, identity management tool 244, application discovery tool 246, developer tool 248, and wrapper function 250). At least some of the steps in method 600 may be performed by a computer having a processor executing commands stored in a memory of the computer (e.g., processors 212 and memories 220). For example, at least some of the commands may be included in an application installed in a client device accessible by a user, and hosted via an API layer in the network server (e.g., application 222, API layer 230). Further, steps as disclosed in method 600 may include retrieving, editing, and/or storing files in a database that is part of, or is communicably coupled to, the computer (e.g., database 252). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes receiving, from a service function executed by an application, a value for the usage of a computational resource when the service function has completed a task.

Step 604 includes generating a metric indicator with the value for the usage of the computational resource.

Step 606 includes determining a cost incurred by a third party based on the metric indicator.

Step 608 includes preparing and distributing an invoice for the cost incurred by the third party to a designated party.

Hardware Overview

Figure 7:
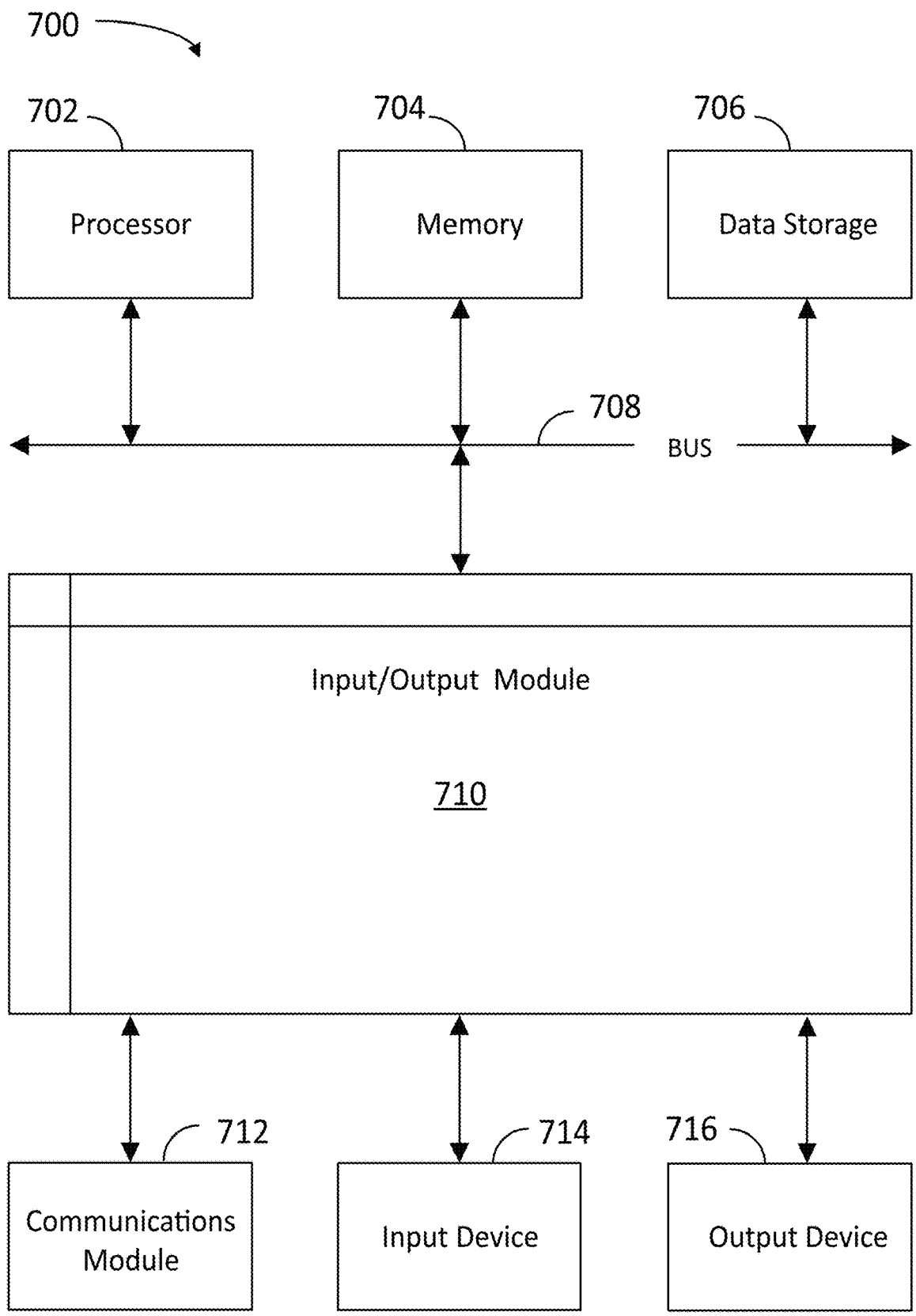
FIG. 7 is a block diagram illustrating an example computer system with which the client and server of FIGS. 1 and 2, and the methods of FIGS. 5 and 6 can be implemented, according to some embodiments.

FIG. 7 is a block diagram illustrating an example computer system 700 with which the client devices 110 and servers 130 of FIGS. 1 and 2, and methods 500 and 600 can be implemented, according to some embodiments. In certain aspects, computer system 700 may be implemented using hardware or a combination of software and hardware, either in a dedicated server, or integrated into another entity, or distributed across multiple entities.

Computer system 700 (e.g., client device 110 and server 130) includes a bus 708 or other communication mechanism for communicating information, and a processor 702 (e.g., processors 212) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, a code that creates an execution environment for the computer program in question, e.g., code that constitutes processor firmware, a protocol stack, a database management system, an operating system, or a combination of one or more of them stored in an included memory 704 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, a special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communications modules 712 (e.g., communications modules 218) include networking interface cards, such as Ethernet cards and modems. In certain aspects, input/output module 710 is configured to connect to a plurality of devices, such as an input device 714 (e.g., input device 214) and/or an output device 716 (e.g., output device 216). Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 716 include display devices, such as an LCD (liquid crystal display) monitor, for displaying information to the user.

According to one aspect of the present disclosure, the client device 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship with each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that include bus 708. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
receiving, from a developer, a service function, wherein the service function includes configuration details for an application available through an online application exchange;
deploying the service function in the online application exchange;
identifying a first domain event requesting access to the service function from a user;
calling, with a wrapper function, the service function in the online application exchange, in response to the first domain event;
recording, with a wrapper function executed on top of the service function, a metric associated with the service function and a return parameter;
emitting a second domain event indicative of a completion of the service function;
charging, with a billing tool, an appropriate party based on a usage metadata for the service function;
granting fine grained permissions to an end user based on the configuration details;
decrypting a secret key in the configuration details upon receipt of the first domain event; and
displaying, in a function dashboard for the online application exchange, a graphic value of the metric associated with the service function.

2. The computer-implemented method of claim 1, wherein the configuration details include a whitelist, and an external authentication network address, further comprising granting fine grained permissions to an end user based on the configuration details.

3. The computer-implemented method of claim 1, wherein the configuration details include a secret key, further comprising decrypting the secret key upon receipt of the first domain event.

4. The computer-implemented method of claim 1, wherein the first domain event is a subscription request to an application from a user, further comprising requesting user credentials to validate a user account for the application.

5. The computer-implemented method of claim 1, further comprising reporting, to the developer, the metric associated with the service function.

6. The computer-implemented method of claim 1, wherein recording a metric associated with the service function comprises recording a return parameter provided by the service function.

7. The computer-implemented method of claim 1, wherein recording a metric comprises generating a value for the metric as a nonlinear combination of a central processor usage, a number of threads used by the service function, and a memory usage.

8. The computer-implemented method of claim 1, wherein the return parameter comprises one of a succeed, fail or pending event, further comprising resubmitting a request for the service function when the return parameter is failed.

9. The computer-implemented method of claim 1, wherein charging an appropriate party comprises charging either of an end user of the application or a platform owner, based on a selection by the developer.

10. The computer-implemented method of claim 1, further comprising determining a cost that has a non-linear dependence with a computational time usage to execute the service function.

11. The computer-implemented method of claim 1, further comprising updating the function dashboard in a developer console when the second domain event is emitted.

12. The computer-implemented method of claim 1, further comprising recording the first domain event indicative of a completion of the service function in a database.

13. A system, comprising:
a memory, storing instructions; and
one or more processors, configured to execute the instructions to cause the system to:
receive, from a developer, a service function, wherein the service function includes configuration details for an application available through an online application exchange;
deploy the service function in the online application exchange;
identify a first domain event, which requests access to the service function from a user;
call, with a wrapper function, the service function in the online application exchange, in response to the first domain event;
record, with a wrapper function executed on top of the service function, a metric associated with the service function and a return parameter;
emit a second domain event indicative of a completion of the service function;
charge, with a billing tool, an appropriate party based on a usage metadata for the service function;
grant fine grained permissions to an end user based on the configuration details;
decrypt a secret key in the configuration details upon receipt of the first domain event; and
display, in a function dashboard for the online application exchange, a graphic value of the metric associated with the service function.

14. The system of claim 13, wherein the configuration details include a secret key, and the one or more processors further execute instructions to decrypt the secret key upon receipt of the first domain event.

15. The system of claim 13, wherein the first domain event is a subscription request to an application from a user, and the one or more processors further execute instructions to request user credentials to validate a user account for the application.

16. The system of claim 13, wherein the one or more processors further execute instructions to report, to the developer, the metric associated with the service function.

17. The system of claim 13, wherein to record a metric associated with the service function the one or more processors execute instructions to record a return parameter provided by the service function.

18. A non-transitory, computer-readable medium storing instructions which, when executed by a processor, cause a computer to perform a method, the method comprising:
receiving, from a developer, a service function, wherein the service function includes configuration details for an application available through an online application exchange;
deploying the service function in the online application exchange;
identifying a first domain event, which requests access to the service function from a user;
calling, with a wrapper function, the service function in the online application exchange, in response to the first domain event;
recording, with a wrapper function executed on top of the service function, a metric associated with the service function and a return parameter;
emitting a second domain event indicative of a completion of the service function;
charging, with a billing tool, an appropriate party based on a usage metadata for the service function;
granting fine grained permissions to an end user based on the configuration details;
decrypting a secret key in the configuration details upon receipt of the first domain event; and
displaying, in a function dashboard for the online application exchange, a graphic value of the metric associated with the service function.

19. The non-transitory, computer-readable medium of claim 18, wherein the first domain event is a subscription request to an application from a user, and the processor further executes instructions to cause the computer to perform requesting user credentials to validate a user account for the application.

20. The non-transitory, computer-readable medium of claim 18, wherein the processor further executes instructions to cause the computer to perform reporting, to the developer, the metric associated with the service function.

* * * * *